Nov. 22, 1949    J. J. KAPLAN    2,488,868
PHOTOGRAPHIC APPARATUS FOR RECORDING
THEATER ATTENDANCE
Filed Aug. 21, 1946    2 Sheets-Sheet 1
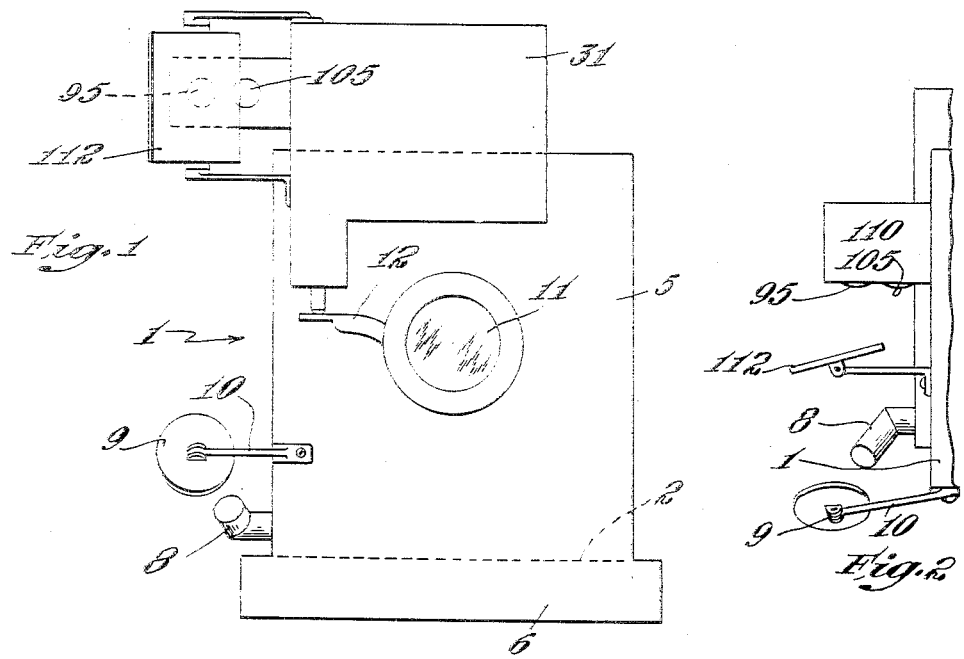
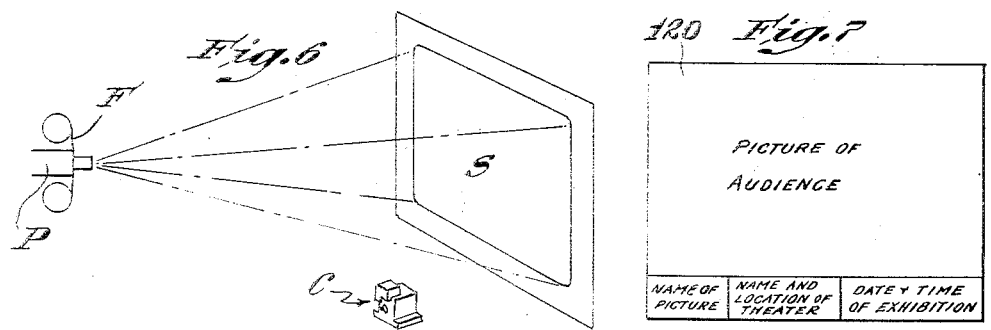
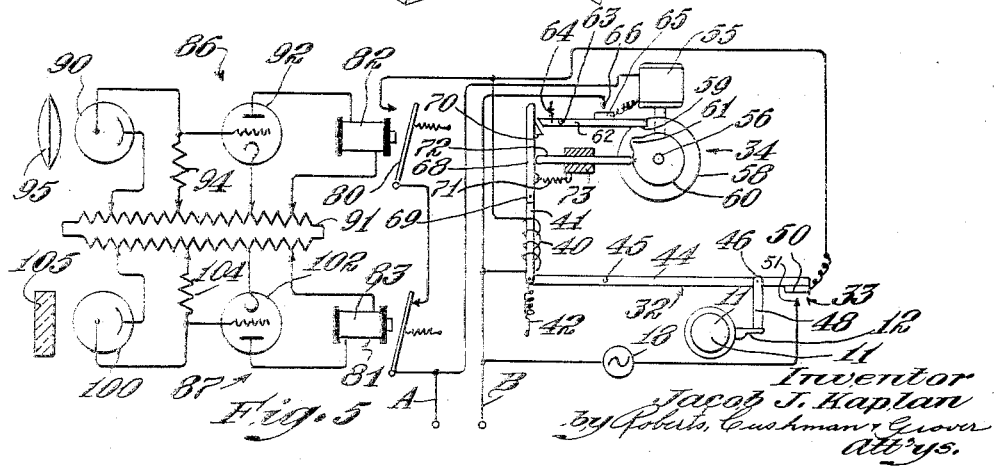
Inventor
Jacob J. Kaplan
by Roberts, Cushman & Grover
Attys.

Nov. 22, 1949   J. J. KAPLAN   2,488,868
PHOTOGRAPHIC APPARATUS FOR RECORDING
THEATER ATTENDANCE
Filed Aug. 21, 1946   2 Sheets-Sheet 2
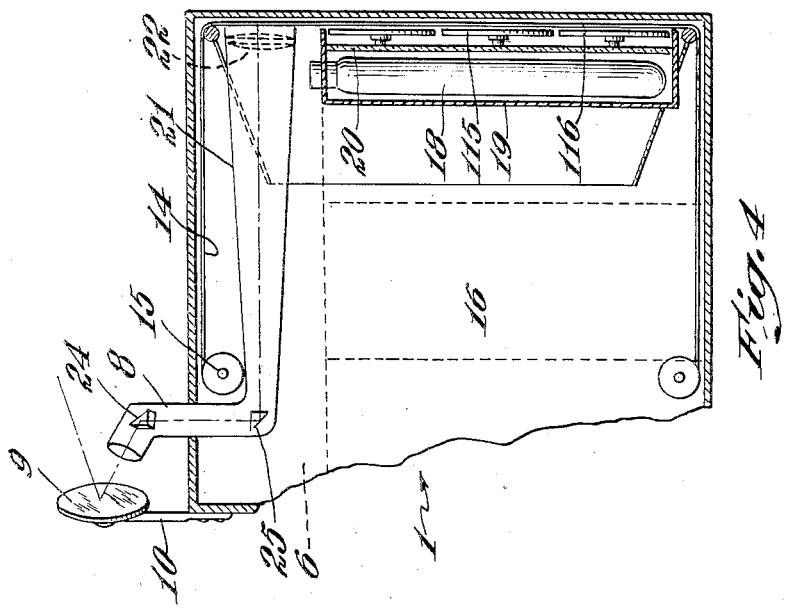
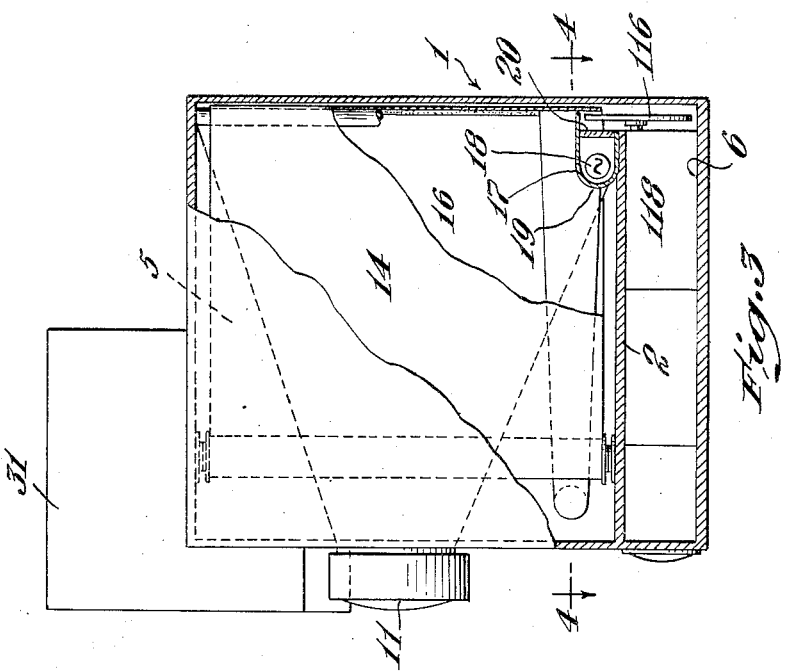
Inventor
Jacob J. Kaplan
by Roberts, Cushman & Grover
Att'ys.

Patented Nov. 22, 1949

2,488,868

UNITED STATES PATENT OFFICE 2,488,868

PHOTOGRAPHIC APPARATUS FOR RECORDING THEATER ATTENDANCE

Jacob J. Kaplan, Boston, Mass.

Application August 21, 1946, Serial No. 692,075

6 Claims. (Cl. 95—11)

This invention relates to a recording apparatus of the general type illustrated in Patent No. 2,409,358 granted to me October 15, 1946, and its principal object is to provide an apparatus for automatically recording visual conditions in response to an activating influence consisting of electromagnetic radiations such, for example, as light of a selected axis of polarization and/or wave length.

Further objects will be apparent from a consideration of the following disclosure wherein the invention is illustrated with particular reference to its use in recording the attendance at a motion-picture theatre or auditorium.

In accordance with the present invention my recording apparatus comprises a camera equipped with a film suitable for recording the desired visual conditions and provided with an operating mechanism actuated by a control device responsive to electromagnetic radiations of predetermined characteristics. The camera and associated operating mechanism may be of any known type such, for example, as is disclosed in my aforementioned patent, the operation of which is initiated by the opening and closing of an electric circuit. The control device comprises an electric circuit which includes a detecting means sensitive to selected electromagnetic radiations, in association with amplifying means, etc., suitable to produce an electric current of sufficient amplitude to initiate the operation of the camera. Although various electronic devices are known which respond to a wide range of electromagnetic radiations, the particular type of detecting means will depend on the activating influence to which it is to respond. Practical considerations indicate the use of a light sensitive device such as a photo-voltaic cell responsive to visible light waves to generate a current or a photo-conductive cell associated with a suitable electromotive force to vary the impedance of an initiating circuit, and in either case suitable means are provided to amplify the current so as to effect the operation of the camera.

The preferred type of control device comprises an electric circuit which includes a photoelectric (photo-conductive) cell associated with a polarizing screen or filter operative in response to light of a predetermined axis of polarization striking the screen or filter to vary the impedance of the circuit so that a solenoid or the like motor means associated with the circuit becomes operative to effect the actuation of the camera. The photoelectric cell may be placed at any point at which it will receive the light from a projector, and hence may be mounted in front of or behind a moving picture screen against which light is projected, in which case the photoelectric cell is connected electrically to the camera.

A recording apparatus illustrative of the foregoing is shown in the accompanying drawings, wherein:

Fig. 1 is a front elevation of a camera constructed in accordance with the present invention;

Fig. 2 is a fragmentary top plan view of the camera and associated parts;

Fig. 3 is a side elevation with parts broken away and shown in section;

Fig. 4 is a fragmentary section substantially on the line 4—4 of Fig. 3;

Fig. 5 is a view showing schematically the operating parts of the camera and control circuit associated therewith;

Fig. 6 is a schematic view illustrating the manner in which the camera is operated by a film being projected against a screen; and Fig. 7 is a view showing the photographic record produced by the camera.

The recording apparatus comprises a housing 1 having, adjacent to its lower end, a horizontal partition 2 (Fig. 3) which divides the interior of the housing into an upper recording compartment 5 and lower compartment 6. The front wall of the recording compartment is provided with a central opening to receive the lens of a camera and the side wall of the lower compartment is provided with an opening through which projects a periscope 8. A reflector 9, supported by an adjustable bracket or arm 10 secured to the front wall of the housing 1, is positioned so as to reflect an image into the eye of the periscope, as shown in Figs. 1, 3 and 4. The recording compartment 5 is of light-proof construction and has a built-in camera which includes the lens 11, shutter, and associated operating lever 12 which controls the period of exposure of a film 14 mounted on rollers and suitably shielded in the customary manner. One of the film-supporting rollers is mounted on a film-winding spindle 15 (Fig. 4) which, when rotated, winds up the film so as to carry the exposed portion from the exposure chamber 16 and simultaneously present an unexposed portion.

The major portion of the film 14 extends through the main exposure chamber 16 and a partition 17 defines a sub-chamber through which only the lower marginal portion of the film extends, as shown in Fig. 3. Mounted within the said chamber is an elongate electrode lamp 18 horizontally disposed in spaced relation to the lower margin of the film 14. Associated with the lamp 18 is a reflector 19 which may be integral with the partition 17, and a screen or filter 20 having optical characteristics suitable to produce the desired exposure on the adjacent area of film 14. It is to be understood that the partition 17 thoroughly shields the lamp 18 so that there is substantially no leakage of light into the main exposure chamber 16.

Th periscope 8 projects into the interior of the lower compartment just below the lower edge of film 14 and its inner end is slightly inclined so as to project an image upwardly through a light-proof frusto-conical tube or shield 21. A lens 22 is carried by the inner end of shield 21 and juxtaposed to the lower edge of the film 14 as shown in Fig. 4. The periscope may be the conventional design, embodying the usual prisms 24 and 25 associated with suitable lenses (not shown) so as to produce a true image for photographically recording on the film 14.

A casing 31 is mounted on the front and top walls of the housing 1 and within this casing is a shutter-operating mechanism 32, associated lamp switch 33, and a film-winding mechanism 34, all indicated in Fig. 5. The operation of these mechanisms is governed by a control device responsive to light of a predetermined polarity, the construction and design of which is hereinafter more fully described.

Referring to Fig. 5, which schematically illustrates the aforementioned mechanisms, the shutter-operating mechanism 32 comprises a solenoid 40 associated with an armature or plunger 41 which is normally held in retracted position by a tension spring 42. The lower end of the plunger is pivotally connected with one arm of a lever 44 which is pivoted at 45, and the other arm of the lever is pivotally connected at 46 to a depending actuator rod 48 engageable with the operating lever 12 of the shutter. The free end of the lever 44 also carries a contact 50 which constitutes a part of switch 33 and is connected through the control device to power line A. The contact 50 is normally held spaced from its companion contact 51 which is connected in series with lamp 18 and to power line B. When the solenoid 40 is energized, the plunger 41 is advanced or moved upwardly and causes shutter lever 12 to be depressed, thereby opening the shutter and simultaneously closing contacts 50 and 51, thereby closing the circuit through the lamp 18. When the solenoid 40 is deenergized, the parts are restored to their normal position by spring 42, thus permitting the shutter to break the circuit through the lamp 18.

The film-winding mechanism 34 comprises an electric motor 55 connected through suitable gearing to a small shaft 56 which, in turn, is connected through suitable gearing to the projecting end of the film-winding spindle 15, it being understood that the gear ratios are such that one revolution of the shaft 56 is sufficient to rotate spindle 15 so as to wind up the exposed film and bring into position for exposure a succeeding area of the film. The construction and arrangement of parts are such that the time interval required for one revolution of the shaft 56 may be of the order of ¼ minute, although a greater or lesser interval would be permissible, depending upon the period of duration of the activating influence to which the control device is responsive.

The shaft 56 carries a disk 58 formed with a notch 59 and a cam 60 formed with a rise element 61. A lever 62, pivoted at 63, is formed with a pawl-like end which is normally held in notch 59 by a small tension spring 64, thus providing, in effect, pawl and ratchet elements normally operative to hold the disk 58 and associated parts locked against counter-clockwise rotation. The lever arm also carries a contact 65 which is connected through the motor 55 to power line A. The contact 65 is normally held spaced from its companion contact 66 which is connected to power line B. The opposite arm of lever 62 is operatively associated with a pull bar 68 which is pivotally connected at 69 with the plunger 41. The pull bar 68 is formed with a ratchet-like tooth 70 engageable with the adjacent end of lever 62 and is normally held in inoperative position by small tension spring 71. One end of plunger 72, slidably mounted in guideways 73, is arranged so as normally to engage the dwell surface of the cam 60 and its other end is engageable with the intermediate portion of the pull bar 68. The construction and arrangement of parts are such that when the solenoid 40 is energized, the plunger 41 and pull bar 68 are advanced or moved upwardly so that the tooth 70 rides over and beyond the end of lever 62, the spring 71 being operative to hold the pull bar in engagement with the lever 62; and when the solenoid is deenergized, the plunger 41 and pull bar 68 are retracted by spring 42, thereby causing the tooth 70 to pull the adjacent arm of lever 62 downwardly and raise the opposite arm upwardly, thus disengaging its pawl-like end from the notch 59 and simultaneously closing the circuit through the motor 55 and contacts 65, 66, whereupon the motor 55 operates to rotate shaft 56 in a counterclockwise direction. As the shaft 56 and associated parts rotate, the rise 61 of cam 60 throws the plunger 72 outwardly against pull bar 68 sufficiently to effect disengagement of the tooth 70 from the end of lever 62, whereupon lever 62 drops downwardly and rides upon the periphery of disk 58, in which position the lever 58 is effective to maintain contacts 65, 66, closed. The shaft 56 continues its rotation until the notch 59 is about to complete one revolution, at which time the end of the lever 62 drops into notch 59, thus breaking the circuit through contacts 65, 66 to shut off the motor, and further rotation of disk 58 is arrested by the engagement of the end of lever arm 62 with the wall of notch 59, thus terminating the film-winding cycle.

The period during which the solenoid 40 is energized, and hence the time of operation of the camera, is governed by the control device which, as shown in Fig. 5, comprises a normally open switch 80 connected in series with a normally closed switch 81 in one branch of the power line A. The switch 80 is operated, i. e., closed, by a solenoid 82 and the switch 81 is opened by a solenoid 83, connected in energizing circuits 86 and 87, respectively. The energizing circuit 86 comprises a photocell 90 having one electrode connected to a potentiometer 91 and its other electrode connected to the grid of an amplifier tube 92, the usual resistor 94 being interposed between the grid connector and potentiometer 91. The plate of tube 92 is connected to one terminal of solenoid 82 and the filament or cathode is connected to potentiometer 91. The other terminal of solenoid 82 is connected to the high voltage end of the potentiometer 91, thus completing the energizing circuit 86.

The photocell 90 may be of conventional type, designed to respond to visible light, and is associated with a lens 95 so that when light strikes the lens it is directed against the photocell which responds to effect energization of solenoid 82 and consequent closing of switch 80.

The energizing circuit 87 is similar to the circuit 86 and includes a photocell 100, amplifier tube 102, and resistor 104, connected with potentiometer 91 and solenoid 83 in the manner above described. The photocell 100 is screened with a light polarizing material or analyzer 105, such as a small sheet of light transmitting material, which permits only the passage of light polarized in one plane, for example, a horizontal plane, so that the energizing circuit 87 normally remains inactive and hence the solenoid 83 deenergized, except at such times when light polarized in a horizontal plane passes through the analyzer 105 and strikes photocell 100 to effect energization of solenoid 83 and consequent opening of switch 81.

The photocells 90 and 100 are disposed within a small housing 110 which is mounted on the top of the camera housing 1 adjoining the casing 31, the housing 110 being provided with a pair of openings to accommodate the lens 95 and analyzer 105. A reflector 112, carried by an adjustable bracket 114 secured to the casing 31 is provided to reflect light directly against the lens and filter. All other parts of the control device may be located within the lower compartment 6 forwardly of an electric clock mechanism which includes a pair of disks 115 and 116, the upper parts of which extend through a suitable opening in partition 2 in juxtaposition to be the lower end of the screen, as shown in Figs. 3 and 4. The disks 115 and 116 are of translucent material and carry opaque characters indicating the day of the month and time of day, as in my aforementioned patent, and these disks are carried by arbors suitably connected with an electric clock motor designated by the number 118.

Between disk 115 and the end of periscope tube 21 (Fig. 4), the partition 2 and shield 19 are suitably recessed to receive a translucent identifying card 120 (Fig. 7) on which is printed in opaque lettering the name and location of the theatre. The construction and arrangement of parts is such that the lower margin of the film 14 may record the title of the picture being displayed, the name and location of the theatre and the date and time of exhibition in the manner presently to be described.

The activating influence for initiating operation of the control device may comprise any suitable means for providing visible light polarized in a plane at right angles to the plane for which the analyzer 105 is designed to pass light, viz., vertically polarized light. Accordingly, a part of the moving picture film being displayed, such as the leader which bears the title, serial number or other significant data, preferably comprises a section of polarizing material, so that light from the moving picture projector is properly polarized in passing through the leader, in which case the apparatus is so positioned that a part of such polarized light either falls directly on the lens 95 and analyzer 105, or is reflected from the moving picture screen S or other suitable reflecting surface of non-depolarizing material.

Where, as schematically illustrated in Fig. 6, the recording apparatus C is located forwardly of the motion-picture screen S with the camera lens 11 covering all seats of the auditorium and with lens 95 and analyzer 105 disposed outside the beam B being projected through the polarized leader of film F by projector P, the reflector 112 is adjusted so as to reflect light from the screen S against the lens 95 and analyzer 105. The reflector 9 is also adjusted so as to reflect or transmit the image on the screen S directly into the periscope 8.

When the theatre or auditorium is in darkness no appreciable light falls on the lens and analyzer, and hence the initiating circuits remain inactive, as shown in Fig. 5. When the theatre is wholly or partially illuminated by light either from the lighting equipment or an ordinary film being displayed, such light is of a diffused character and when it strikes the lens 95 and analyzer 105 it effects the operation of both initiating circuits, consequently closing switch 80 and simultaneously opening switch 81. Hence, the actuating circuit conjointly controlled by these switches remains open.

When a moving picture film having a leader of polarized material is projected, the light beam B is polarized in a vertical plane, it being understood that the length of the polarized section of the leader is sufficient to produce a properly polarized light for a period sufficient to insure the proper period of exposure. The polarized light thus produced is reflected from the screen S against the reflector 112 which in turn reflects the polarized light against the lens 95 and analyzer 105. Simultaneously the data carried by the polarized leader is reflected by mirror 9 into the periscope 8.

The polarized light striking the lens 95 falls on photocell 90 which effects energization of solenoid 82 and consequent closing of switch 80, and at the same time the reflected polarized light strikes analyzer 105. Since analyzer 105 passes light which is polarized only in a horizontal plane, the reflected light does not fall on the photocell 100 and hence it remains inactive, consequently permitting switch 81 to remain closed. With switches 80 and 81 both closed the actuating circuit is brought into operation to energize solenoid 40 which, as above explained, operates simultaneously the camera shutter and light 18.

After the polarized portion of the leader has passed, diffused light is projected and reflected by the screen and the horizontally polarized component of such diffused light passes through analyzer 105 and falls upon photocell 100. Consequently, initiating circuit 87 is brought into operation and as a result solenoid 83 opens switch 81, thus breaking the actuating circuit and deenergizing solenoid 40. The deenergization of solenoid 40 is followed by the operation of the film-winding mechanism, as previously explained, thus completing the operating cycle during which the recording apparatus is automatically operative to photograph the audience and simultaneously record the title of the picture, the name and location of the theatre, and the date and time of such recording, as illustrated in Fig. 7.

In place of the particular design above-described, the lens 95 may be such as to permit the passage of light of any wave length, but the analyzer 105 is replaced by a suitable filter of a material which is impervious to the passage of light of a given wave length, in which event the leader of film F includes a portion which is of a material permitting the passage of light of the wave length to which the filter is impervious. Hence, the operation of the recording apparatus is substantially identical, except that the activating influence consists of light of a given wave length, rather than light of a given polarity. Another alternative is to provide at 90 a photocell sensitive to light of all wave lengths and at 100 a photocell which is not sensitive to light of a given wave length, in which event the filter may be dispensed with and the leader of film F includes a portion permitting the passage of light of said given wave length. In all other particulars the design and operation of the apparatus are the same.

While I have shown and described one desirable embodiment of the invention, it is to be understood that this disclosure is for the purpose of illustration and that various changes and modifications may be made without departing from the spirit and scope of the invention as set forth in the appended claims.

I claim:

1. In a system for recording the attendance at an auditorium at a time when moving pictures are being projected from a film, recording apparatus comprising a control portion of said film which is composed of a material which transmits light of a predetermined character different from that transmitted by the remainder of the film, a camera having an operating member, energizable motor means for actuating said operating member, and control means for governing the energization of said motor means, including detecting means adapted to receive light projected through said control portion, said detecting means being responsive only to light of said predetermined character to effect the energization of said motor means and consequent operation of said camera.

2. In a system for recording the attendance at an auditorium at a time when moving pictures are being projected from a film, recording apparatus comprising a control portion of said film which is composed of a material which transmits light polarized in a predetermined plane, the remainder of the film transmitting unpolarized light, a camera having an operating member, energizable motor means for actuating said operating member, and control means for governing the energization of said motor means, including detecting means adapted to receive polarized light projected through said control portion, said detecting means being responsive only to light polarized in said predetermined plane to effect the energization of said motor means and consequent operation of said camera.

3. In a system for recording the attendance at an auditorium at a time when moving pictures are being projected from a film, recording apparatus comprising a control portion of said film which is composed of a material which transmits light of a predetermined wave length different from that transmitted by the remainder of the film, a camera having an operating member, energizable motor means for actuating said operating member, and control means for governing the energization of said motor means, including detecting means adapted to receive light projected through said control portion, said detecting means being responsive only to light of said predetermined wave length to effect the energization of said motor means and consequent operation of said camera.

4. In a system for recording the attendance at an auditorium at a time when moving pictures are being projected from a film portion composed of a material which transmits light of a predetermined character different from that transmitted by the remainder of said film, recording apparatus comprising a camera having an operating member, motor means for actuating said operating member, and control means for governing the operation of said motor means, including an actuating circuit connected to said motor means and having two switches connected in series, energizing circuits each having a relay actuating one of the switches, a photoelectric cell adapted to receive light projected through said film and responsive to such projected light to produce variations in the electrical characteristics of one of said energizing circuits so as to effect the operation of the switch actuated by the relay connected therein, and a second photoelectric cell adapted to receive light projected through said film and responsive to light other than that having said predetermined characteristics to produce variations in the electrical characteristics of the other of said energizing circuits so as to effect the operation of the switch actuated by the relay connected therein, said switches being conjointly operative to effect the actuation of said operating member when light is projected through said portion of film composed of material which transmits light of said predetermined characteristic.

5. In a system for recording the attendance at an auditorium at a time when moving pictures are being projected from a film having a portion composed of a material which transmits light polarized in a predetermined plane, the remainder of said film being of a material which transmits unpolarized light, recording apparatus comprising a camera having an operating member, motor means for actuating said operating member, and control means for governing the operation of said motor means, including an actuating circuit connected to said motor means and having two switches connected in series, two energizing circuits each having a relay actuating one of the switches, a photoelectric cell adapted to receive light projected through said film and responsive to such projected light to produce variations in the electrical characteristics of one of said energizing circuits so as to effect the operation of the switch actuated by the relay connected therein, a second photoelectric cell adapted to receive light projected through said film, and an analyzer interposed between said second photoelectric cell and said film so that only light polarized in a plane normal to said predetermined plane is projected upon said second photoelectric cell to produce variations in the electrical characteristics of the other of said energizing circuits so as to effect the operation of the switch actuated by the relay connected therein, said switches being conjointly operative to effect the actuation of said operating member when light is projected through said portion of film composed of light-polarizing material.

6. In a system for recording the attendance at an auditorium at a time when moving pictures are being projected from a film having a portion composed of a material which transmits light of a predetermined wave length, the remainder of said film being of a material which transmits light having different wave lengths, recording apparatus comprising a camera having an operating member, motor means for actuating said operating member, and control means for governing the operation of said motor means, including an actuating circuit connected to said motor means and having two switches connected in series, two energizing circuits each having a relay actuating one of the switches, a photoelectric cell adapted to receive light projected through said film and responsive to such projected light to produce variations in the electrical characteristics of one of said energizing circuits so as to effect the operation of the switch actuated by the relay connected therein, a second photoelectric cell adapted to receive light projected through said film, and a color filter interposed between said second photoelectric cell and said film so that only light having other than said predetermined wave length is projected upon said second photoelectric cell to produce variations in the electrical characteristics of the other of said energizing circuits so as to effect the operation of the switch actuated by the relay connected therein, said switches being conjointly operative to effect the actuation of said operating member when light is projected through said portion of film composed of material which transmits light of said predetermined wave length.

JACOB J. KAPLAN.

REFERENCES CITED

The following references are of record in the file of this patent:

UNITED STATES PATENTS

| Number | Name | Date |
|---|---|---|
| 891,339 | Hirt | June 23, 1908 |
| 1,354,932 | Wilson | Oct. 5, 1920 |
| 1,950,273 | Speakman | Mar. 6, 1934 |
| 2,041,079 | Lyle | May 19, 1936 |
| 2,086,087 | Melton | July 6, 1937 |
| 2,109,361 | Spiegel | Feb. 22, 1938 |
| 2,135,575 | Hansch et al. | Nov. 8, 1938 |
| 2,311,914 | Tiffin et al. | Feb. 23, 1943 |
| 2,315,978 | Moorefield | Apr. 6, 1943 |
| 2,402,580 | Roters | June 25, 1946 |
| 2,409,358 | Kaplan | Oct. 15, 1946 |